US012454892B2

(12) United States Patent
Van Bemmel et al.

(10) Patent No.: US 12,454,892 B2
(45) Date of Patent: Oct. 28, 2025

(54) TURBINE HOUSING WITH REDUCED BLADE PASS NOISE FOR USE IN A TURBOCHARGER

(71) Applicant: Mitsubishi Heavy Industries Engine & Turbocharger, Ltd., Kanagawa (JP)

(72) Inventors: Arjan Van Bemmel, Almere (NL); Jeffrey Van Den Broek, Almere (NL)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/270,959

(22) PCT Filed: Jan. 8, 2021

(86) PCT No.: PCT/IB2021/050121
§ 371 (c)(1),
(2) Date: Jul. 5, 2023

(87) PCT Pub. No.: WO2022/148993
PCT Pub. Date: Jul. 14, 2022

(65) Prior Publication Data
US 2024/0060421 A1 Feb. 22, 2024

(51) Int. Cl.
*F01D 9/02* (2006.01)

(52) U.S. Cl.
CPC .......... *F01D 9/026* (2013.01); *F05D 2220/40* (2013.01); *F05D 2240/14* (2013.01); *F05D 2260/96* (2013.01)

(58) Field of Classification Search
CPC ............. F05D 2220/40; F05D 2240/14; F05D 2260/96; F01D 9/026
See application file for complete search history.

(56) References Cited

U.S. PATENT DOCUMENTS 4,629,394 A * 12/1986 Leachman, Jr. ...... F04D 29/445 415/49
5,180,280 A * 1/1993 Honda .................. F04D 29/428 415/206
(Continued)

FOREIGN PATENT DOCUMENTS

CN 104145102 A 11/2014
DE 2 230 718 A 1/1974
(Continued)

OTHER PUBLICATIONS

Translation DE-102007058246-A1 (Year: 2024).*
(Continued)

*Primary Examiner* — J. Todd Newton
(74) *Attorney, Agent, or Firm* — BIRCH, STEWART, KOLASCH & BIRCH, LLP

(57) ABSTRACT

The invention relates to a turbine housing for use in a turbocharger, comprising a wheel housing space, an inlet, at least one volute, and a tongue that projects from a separation wall. The tongue is configured to guide an exhaust gas flow to a section of the wheel housing space where an inducer area of a turbine wheel to be accommodated by the turbine housing is to be located. At least one of the tongue and the separation wall is configured to enable a portion of the exhaust gas flow to pass therethrough as a leakage flow from an upstream side of the at least one of the tongue and the separation wall to a downstream side of the at least one of the tongue and the separation wall.

14 Claims, 7 Drawing Sheets

(56) References Cited

U.S. PATENT DOCUMENTS

| | | | | | |
|---|---|---|---|---|---|
| 5,286,162 | A * | 2/1994 | Veres | F04D 29/422 415/206 |
| 5,779,444 | A * | 7/1998 | Onigata | F04D 29/669 415/206 |
| 2014/0363282 | A1* | 12/2014 | Katou | F02B 47/08 415/204 |
| 2016/0230651 | A1 | 8/2016 | Jenks | |
| 2024/0060421 | A1* | 2/2024 | Van Bemmel | F01D 9/026 |

FOREIGN PATENT DOCUMENTS

| | | | | |
|---|---|---|---|---|
| DE | 102007058246 | A1 * | 6/2009 | F01D 17/143 |
| DE | 11 2013 001 950 | T5 | 12/2014 | |
| DE | 10 2016 013 346 | A1 | 5/2018 | |
| EP | 2 886 875 | A1 | 6/2015 | |
| FR | 2906581 | A3 * | 4/2008 | F04D 29/428 |
| JP | 7-49036 | A | 2/1995 | |
| JP | 10-68303 | A | 3/1998 | |
| JP | 2010-144664 | A | 7/2010 | |
| JP | 2014-114727 | A | 6/2014 | |
| JP | 2016-98666 | A | 5/2016 | |
| JP | 2017-172495 | A | 9/2017 | |
| JP | 2019-23474 | A | 2/2019 | |
| JP | 2020-133587 | A | 8/2020 | |
| JP | 2022045100 | A * | 3/2022 | |
| WO | WO 2013/133312 | A1 | 9/2013 | |
| WO | WO-2022263370 | A1 * | 12/2022 | F04D 1/00 |

OTHER PUBLICATIONS

Translation FR-2906581-A3 (Year: 2024).*

Translation JP-2022045100-A (Year: 2025).*

International Search Report, issued in PCT/IB2021/050121, dated Oct. 11, 2021.

Written Opinion of the International Searching Authority, issued in PCT/IB2021/050121, dated Oct. 11, 2021.

* cited by examiner

TURBINE HOUSING WITH REDUCED BLADE PASS NOISE FOR USE IN A TURBOCHARGER

FIELD OF THE INVENTION

The present invention relates to a turbine housing configured to be used in a turbocharger and to accommodate a turbine wheel, the turbine housing comprising: an inlet that is configured to introduce an exhaust gas flow of an engine into the turbine housing, at least one volute defining a flow path of the exhaust gas flow through the turbine housing from the inlet towards a wheel housing space in the turbine housing where the turbine wheel to be accommodated by the turbine housing is to be located, and a tongue that projects from a separation wall delimiting a portion of the at least one volute and that is configured to guide the exhaust gas flow to a section of the wheel housing space where an inducer area of the turbine wheel to be accommodated by the turbine housing is to be located.

Further, the present invention relates to a turbocharger comprising the turbine housing as described here before and a turbine wheel accommodated by the turbine housing, wherein the turbine wheel is located in the wheel housing space of the turbine housing.

Still further, the present invention relates to a method of directing an exhaust gas flow of an engine through a turbine part of a turbocharger where a turbine housing and a turbine wheel accommodated by the turbine housing are present.

BACKGROUND OF THE INVENTION

Turbochargers are well known devices for supplying air to the intake of an internal combustion engine at pressures above atmospheric (boost pressures). In general, a turbocharger comprises a turbine wheel that is arranged and configured to be driven by an exhaust gas flow of the engine. The turbine wheel is mounted on a rotatable shaft and is accommodated by a turbine housing. A compressor wheel is mounted on the other end of the shaft and is accommodated by a compressor housing. Hence, the compressor wheel is arranged to rotate along with the turbine wheel. The compressor wheel serves to deliver compressed air to the engine intake manifold. Conventionally, the turbocharger shaft is supported by journal and thrust bearings, including appropriate lubricating systems, located in a central bearing housing that is present at a position between the turbine housing and the compressor housing.

During operation of the turbocharger, an exhaust gas flow of an engine is introduced into the turbine housing through the inlet of the turbine housing and flows towards the turbine wheel via the at least one scroll-shaped volute. The turbine wheel is configured to be rotated under the influence of the exhaust gas flow and to thereby also cause rotation of the shaft and the compressor wheel. In this way, the compressor wheel is enabled to realize the functionality of the turbocharger as envisaged, i.e. the functionality of compressing air to be supplied to the engine.

A portion of the at least one volute of the turbine housing is delimited by a separation wall arranged inside the turbine housing. A tongue is arranged so as to project from the separation wall and is configured to guide the exhaust gas flow to an inducer area of the turbine wheel. It is practical if the tongue and the separation wall are provided as an entirety. The tongue may have a generally tapered shape towards the tip thereof.

In a turbine housing of a double-volute design, the clearance between the tongue and the turbine wheel has a large effect on the turbine performance. This is caused by leakage between the fed volute, i.e. the volute to which the exhaust gas flow is introduced, and the non-fed volute at the position of the clearance. In view thereof, it would be desirable to have a small clearance. However, a disadvantage of a small clearance is an increased sound pressure level of the blade pass noise, i.e. noise following from the blades of the turbine wheel passing the tongue. In this respect, it is assumed that part of the blade pass noise is caused by the turbine wheel blades passing through an area of separated wake flow downstream of the tongue. A small gap between the tip of the tongue and the tip of the respective turbine wheel blades intensifies the blade pass noise as a smaller gap involves a longer path of the turbine wheel blades through the area of separated wake flow.

In view of the fact that the number of turbine wheel blades is normally high, the critical turbocharger speed is relatively low, in a range of 60,000 to 110,000 rpm. The relatively low turbocharger speed often occurs at low engine load conditions, in which conditions engine noise is low so that the turbocharger noise is often not masked.

Typical examples of vehicle operations involving low engine load conditions include:

- Parking of a car
- Driving away at a parking gate (with window open for ticket)
- Departing/arriving with a car while people are watching
- Driving in a traffic jam
- Driving indoor and/or through tunnels In "normal" vehicles, the driver compartment is isolated from noise and the blade pass noise is not (yet) critical. However, the blade pass noise is denoted as critical design criterion for convertible cars (in respect of both open roof state and closed roof state as the convertible roof is less noise-isolated). The blade pass noise is also denoted as critical design criterion when taking in to account the option of having one or more windows in an open state.

SUMMARY OF THE INVENTION

It is an objective of the present invention to provide a turbine housing that is designed to reduce the level of blade pass noise, without needing to apply expensive measures and without (significantly) affecting turbine performance.

Aspects of the present invention are set out in the accompanying independent and dependent claims. Features from the dependent claims may be combined with features from the respective independent claims as appropriate and not merely as explicitly set out in the claims and explained in the following description.

In view of the foregoing, the present invention provides a turbine housing configured to be used in a turbocharger and to accommodate a turbine wheel, wherein the turbine housing comprises an inlet that is configured to introduce an exhaust gas flow into the turbine housing, at least one volute defining a flow path of the exhaust gas flow through the turbine housing from the inlet towards a wheel housing space in the turbine housing where the turbine wheel to be accommodated by the turbine housing is to be located, and a tongue that projects from a separation wall delimiting a portion of the at least one volute and that is configured to guide the exhaust gas flow to a section of the wheel housing space where an inducer area of the turbine wheel to be accommodated by the turbine housing is to be located, wherein at least one of the tongue and the separation wall is configured to enable a portion of the exhaust gas flow to pass therethrough as a leakage flow from an upstream side of the at least one of the tongue and the separation wall to a downstream side of the at least one of the tongue and the separation wall.

It follows from the above general definition of the turbine housing according to the present invention that the invention is functional at a position where the exhaust gas flow passes from an upstream side of the tongue and the separation wall to a downstream side of the tongue and the separation wall. According to the present invention, at least one of the tongue and the separation wall is configured to enable a portion of the exhaust gas flow to pass therethrough as a leakage flow from the upstream side of the at least one of the tongue and the separation wall to the downstream side of the at least one of the tongue and the separation wall. Thus, when the present invention is put to practice, a portion of the exhaust gas flow is made to pass between the tongue and the turbine wheel, as is normally the case, while another portion of the exhaust gas flow, which is preferably a much smaller portion so that turbocharger performance is reduced to a minimal extent only, or practically not at all, is allowed to pass through at least one of the tongue and the separation wall as a leakage flow. The present invention pertains to ways in which the at least one of the tongue and the separation wall is configured to define the leakage flow as mentioned. For the sake of clarity, it is noted that the terms "downstream" and "upstream" as used in the present text are related to a direction of the exhaust gas flow.

With reference to the above explanation of the background of the invention, it is noted that enabling the leakage flow through at least one of the tongue and the separation wall results in reduction of the intensity/occurrence of the area of separated wake flow downstream of the tongue. In view thereof, the present invention may not only be advantageous in that the level of blade pass noise can be reduced, but also in that a level of material stress in the tip of the respective turbine wheel blades can be reduced so that turbine wheel blade durability can be improved.

It is practical if the at least one of the tongue and the separation wall includes at least one open flow path extending between the upstream side of the at least one of the tongue and the separation wall and the downstream side of the at least one of the tongue and the separation wall. During the manufacturing process of the turbine housing, such an open flow path can be partly or integrally created in a conventional step of the manufacturing process, such as a casting step, or can be partly or integrally created in an additional step, such as a machining step.

In an embodiment of the turbine housing, the at least one open flow path comprises a slit that is located in a tip portion of the tongue and that is open to the section of the wheel housing space where the inducer area of the turbine wheel to be accommodated by the turbine housing is to be located. It is noted that in order to avoid disturbance of the exhaust gas flow as much as possible, it is advantageous if a bottom surface of the slit in the tip portion of the tongue generally extends in a direction of the exhaust gas flow defined by the at least one volute. In this respect, at least the following two options exist:

- the bottom surface of the slit is concentric with the wheel housing space, wherein it may be practical if a radius of the bottom surface of the slit to an axis that is central in the wheel housing space is between a radius of the wheel housing space and 130% of the radius of the wheel housing space, or
- the bottom surface of the slit generally extends according to a tangential line that extends in a direction between 80° to 100° to a radius of the bottom surface of the slit as measured in a range of 60° upstream of the tip of the tongue to 20° downstream of the tip of the tongue.

In another embodiment of the turbine housing, the at least one open flow path comprises a channel that extends through one of the tongue and the separation wall. Such a channel may be provided as a bore in one of the tongue and the separation wall, for example. The channel may also be referred to as through-hole. In general, it may be so that the channel extends through one of the tongue and the separation wall, as mentioned, wherein the channel is only accessible from the outside at the two opposite open ends thereof, and is otherwise surrounded by material of the one of the tongue and the separation wall. It may be advantageous if the channel is located in an area extending along 90° upstream of the tip of the tongue. For the sake of completeness, it is noted that indications of a value of degrees upstream or downstream of the tip of the tongue are to be understood so as to relate to the generally circular outline of the wheel housing space.

Irrespective of whether the at least one open flow path comprises a slit or a channel, it may be so that the tongue of the turbine housing includes at least two open flow paths extending between the upstream side of the tongue and the downstream side of the tongue. If so desired, any appropriate combinations of the above-mentioned options relating to the slit and the channel may be applied.

The present invention covers turbine housings of various designs, including turbine housings of a single volute design and turbine housings of a multi-volute design.

In respect of the option of the turbine housing being of a multi-volute design, an embodiment of the turbine housing is feasible in which the turbine housing is of a double-volute design and comprises two sets of a separation wall and a tongue that projects from the separation wall, wherein at least one of the tongue and the separation wall is configured to enable a portion of the exhaust gas flow to pass therethrough as a leakage flow from an upstream side of the at least one of the tongue and the separation wall to a downstream side of the at least one of the tongue and the separation wall in each of the two sets of a separation wall and a tongue that projects from the separation wall.

The present invention further relates to a turbocharger comprising a turbine wheel and the turbine housing as described here before, wherein the turbine wheel is located in the wheel housing space of the turbine housing. With reference to the above explanation of the background of the invention, it is noted that during operation of the turbocharger, the turbine wheel is driven by an exhaust gas flow of an engine so that rotation of a compressor wheel accommodated by a compressor housing and directly linked to the turbine wheel is realized as well.

In terms of a method, the present invention relates to a method of directing an exhaust gas flow of an engine through a turbine part of a turbocharger where a turbine housing and a turbine wheel accommodated by the turbine housing are present.

The method involves the following:

- enabling the exhaust gas flow to proceed through the turbine housing from an inlet of the turbine housing towards the turbine wheel, and
- enabling a major portion of the exhaust gas flow to proceed along a separation wall in the turbine housing and a tongue that projects from the separation wall, and to be guided to an inducer area of the turbine wheel by the tongue, while enabling a minor portion of the exhaust gas flow to pass through at least one of the tongue and the separation wall as a leakage flow from an upstream side of the at least one of the tongue and the separation wall to a downstream side of the at least one of the tongue and the separation wall under the influence of a pressure difference across the at least one of the tongue and the separation wall.

In the practical case that the at least one of the tongue and the separation wall includes at least one open flow path extending between the upstream side of the at least one of the tongue and the separation wall and the downstream side of the at least one of the tongue and the separation wall, the method may further comprise:

enabling the minor portion of the exhaust gas flow to proceed through the at least one open flow path.

This implies that in the case that the at least one open flow path comprises the above-mentioned slit, the method comprises enabling the minor portion of the exhaust gas flow to proceed through the slit, and that in the case that the at least one open flow path comprises the above-mentioned channel, the method comprises enabling the minor portion of the exhaust gas flow to proceed through the channel.

It can be understood that various options in respect of the method according to the present invention may relate to the above-described options relating to the turbine housing according to the present invention and the turbocharger according to the present invention, and may involve the same features or combinations of features. Accordingly, the aspects of the earlier discussions and explanations are also applicable when the present invention is expressed in the terms of the method.

BRIEF DESCRIPTION OF THE DRAWINGS

Further features and advantages of the present invention will become apparent from the description of the invention by way of exemplary and non-limiting embodiments of a turbine housing of a turbocharger.

The person skilled in the art will appreciate that the described embodiments of the turbine housing according to the present invention are exemplary in nature only and not to be construed as limiting the scope of protection defined in the claims in any way. The person skilled in the art will realize that alternatives and equivalent embodiments of the turbine housing can be conceived and reduced to practice without departing from the scope of protection of the present invention.

Figure 1:
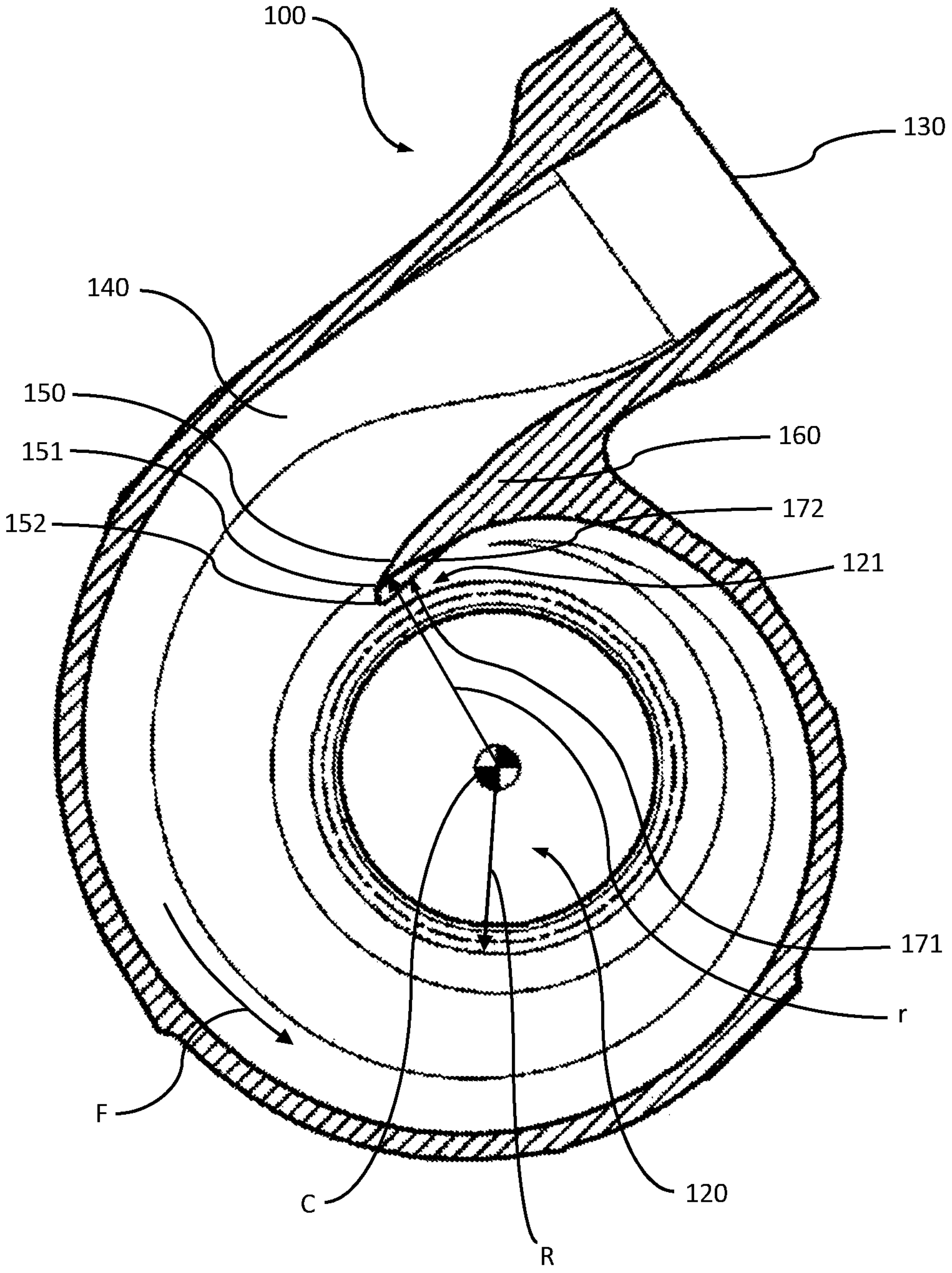
Figure 2:
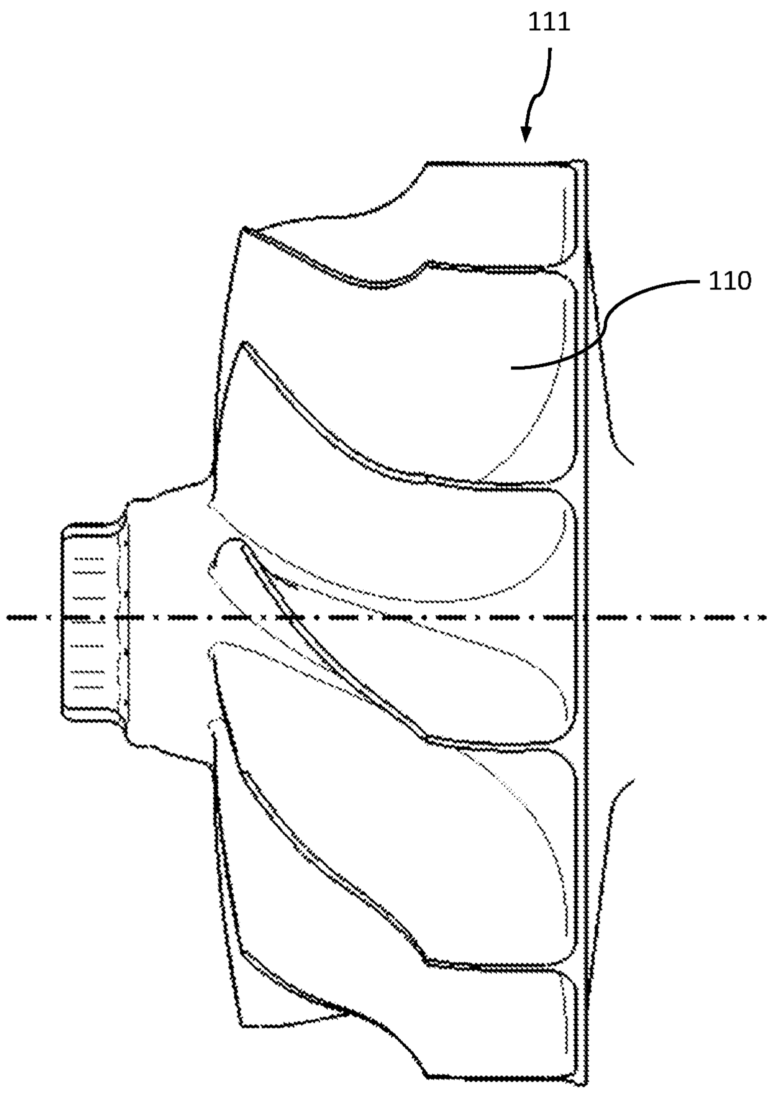
Figure 3:
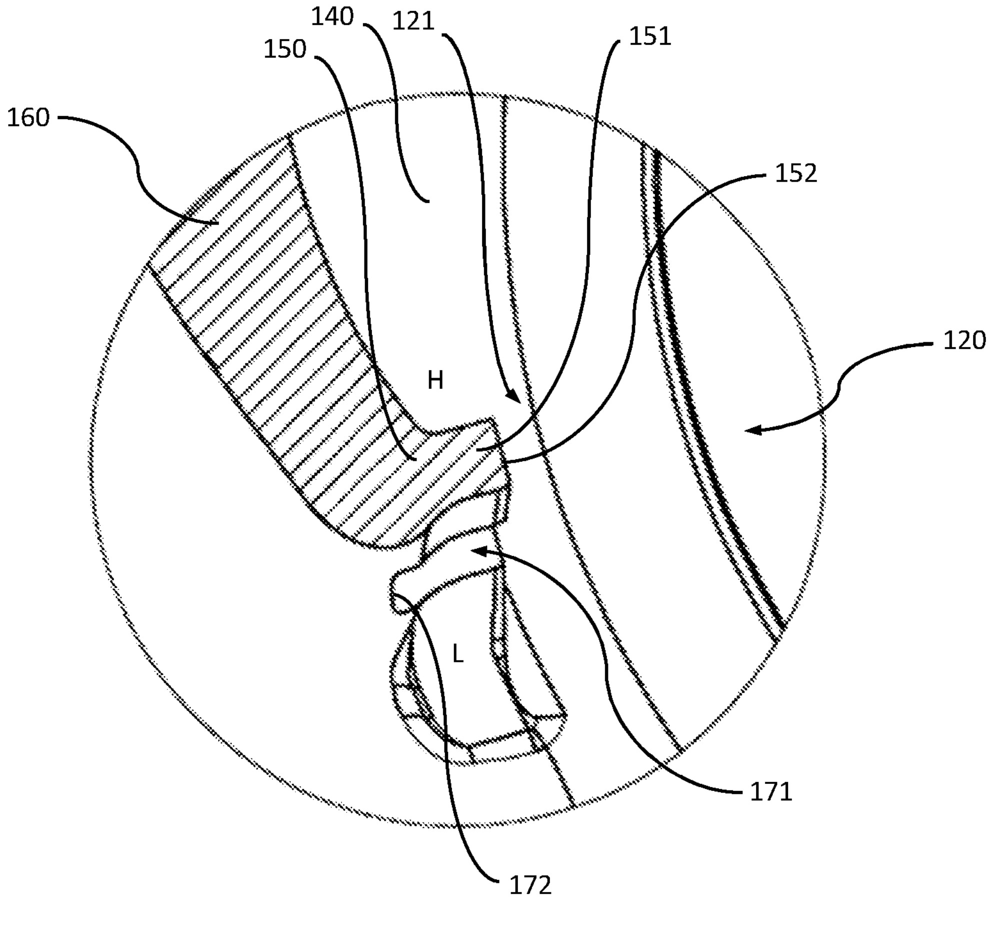
Figure 4:
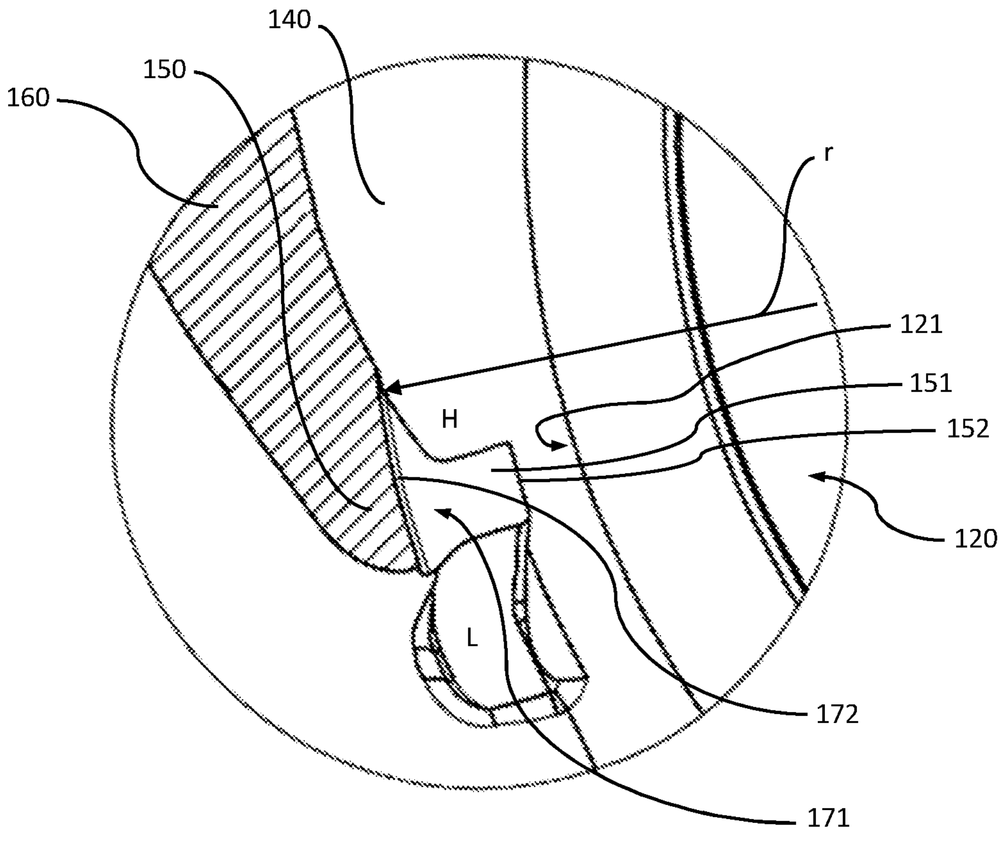
Figure 5:
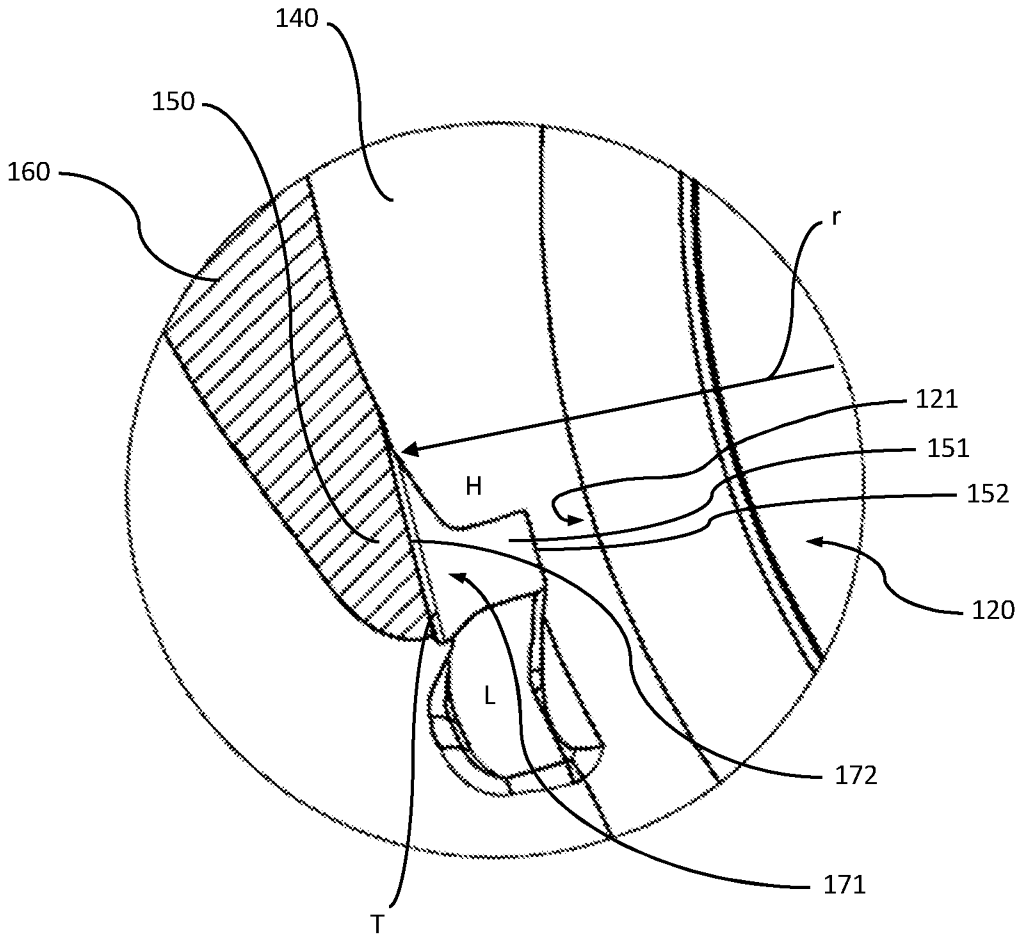
Figure 6:
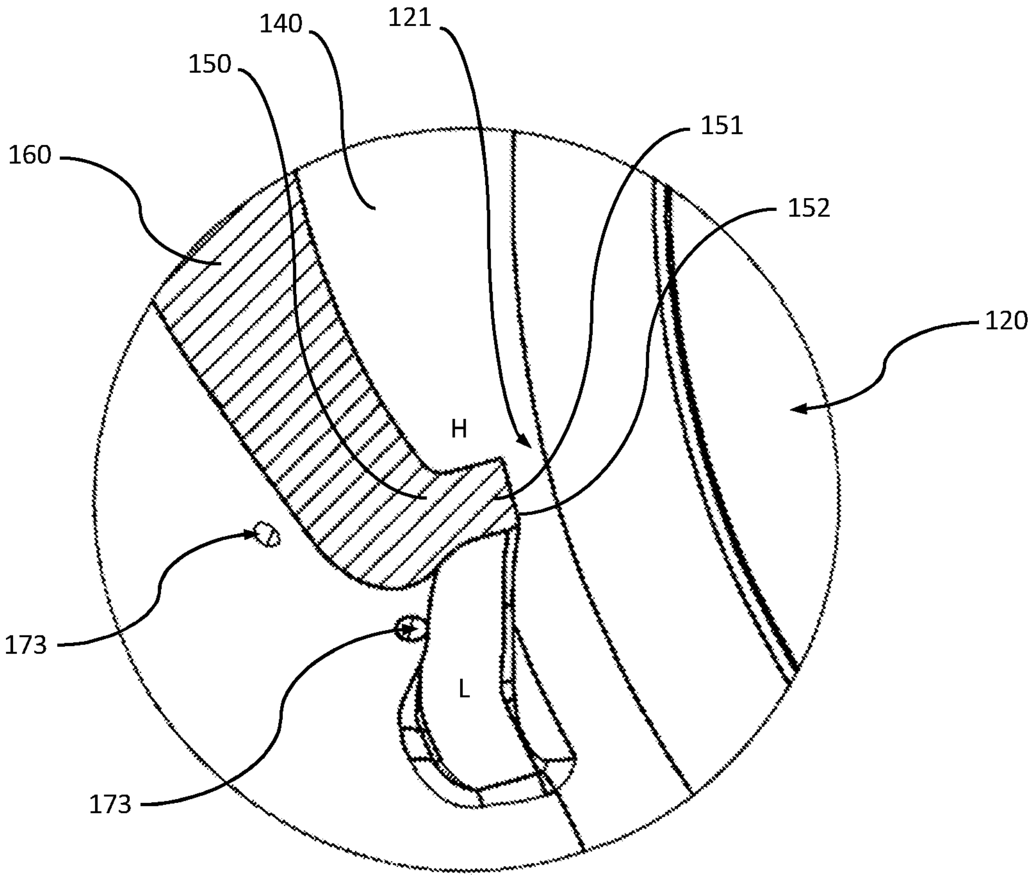
Figure 7:
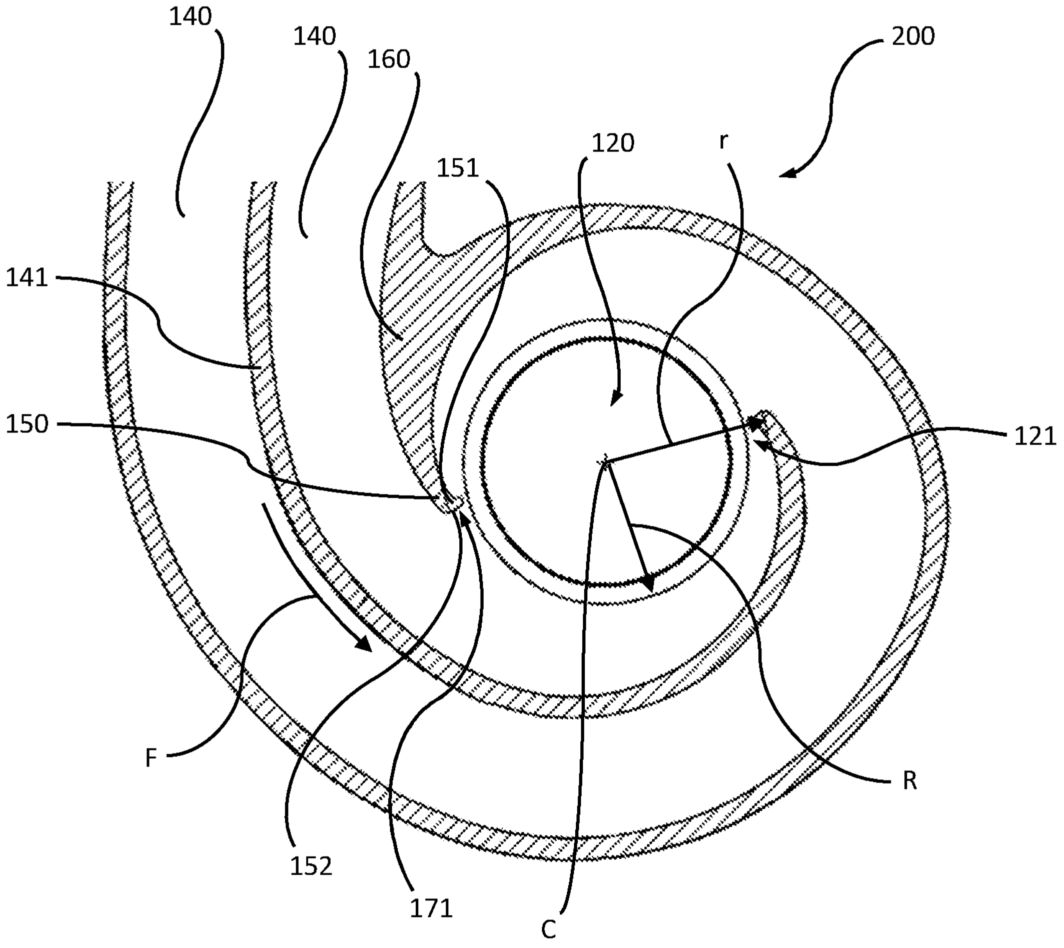

Reference will be made to the figures on the accompanying drawing sheets. The figures are schematic in nature and therefore not necessarily drawn to scale. Further, equal reference numerals denote equal or similar parts. On the attached drawing sheets, FIG. 1 diagrammatically shows a sectional view of a turbine housing of a single-volute design according to an embodiment of the invention, which turbine housing is intended to be applied in a turbocharger;

FIG. 2 diagrammatically shows a side view of a turbine wheel to be accommodated by the turbine housing;

FIG. 3 diagrammatically shows a portion of an embodiment of the turbine housing including a slit that is located in a tongue of the turbine housing;

FIG. 4 diagrammatically illustrates a first possible design of a bottom surface of the slit;

FIG. 5 diagrammatically illustrates a second possible design of a bottom surface of the slit;

FIG. 6 diagrammatically shows a portion of an embodiment of the turbine housing including two channels which are located in the tongue of the turbine housing; and FIG. 7 diagrammatically shows a sectional view of a turbine housing of a double-volute design according to an embodiment of the invention, which turbine housing is intended to be applied in a turbocharger.

DETAILED DESCRIPTION OF EMBODIMENTS

FIG. 1 diagrammatically shows a sectional view of a turbine housing 100 of a single-volute design according to an embodiment of the invention, which turbine housing 100 is intended to be applied in a turbocharger. FIG. 2 diagrammatically shows a side view of a turbine wheel 110 to be accommodated by the turbine housing 100. The general design of the turbine housing 100 is comparable to general designs of commonly known turbine housings for use in turbochargers and will therefore only be shortly elaborated on in the present text.

The turbine housing 100 comprises a wheel housing space 120 where the turbine wheel 110 to be accommodated by the turbine housing 100 is to be located, and further comprises an inlet 130 and a volute 140. The inlet 130 serves for introducing an exhaust gas flow of an engine into the turbine housing 100. The volute 140 defines a flow path of the exhaust gas flow through the turbine housing 100 from the inlet 130 towards the wheel housing space 120. In FIG. 1, a direction of the exhaust gas flow defined by the volute 140 is indicated by an arrow F.

The turbine housing 100 also comprises a tongue 150 that projects from a separation wall 160, wherein the separation wall 160 delimits a portion of the volute 140, and wherein the tongue 150 is configured to guide the exhaust gas flow to a section 121 of the wheel housing space 120 where an inducer area 111 of the turbine wheel 110 is to be located.

In the shown embodiment, the tongue 150 is provided with a slit 171 constituting an open flow path that extends between an upstream side H of the tongue 150 and a downstream side L of the tongue 150. A portion of the turbine housing 100 including the slit 171 is shown in more detail in FIG. 3. The slit 171 is located in a tip portion 151 of the tongue 150 and is open to the section 121 of the wheel housing space 120 where the inducer area 111 of the turbine wheel 110 is to be located. A bottom surface 172 of the slit 171 in the tip portion 151 generally extends in the direction F of the exhaust gas flow. On the basis of the presence of the slit 171 in the tongue 150, the tongue 150 is configured to enable a portion of the exhaust gas flow to pass therethrough as a leakage flow from the upstream side H to the downstream side L. An advantage of realizing such a leakage flow during operation of a turbocharger in which the turbine housing 100 may be included is that reduction of a level of a blade pass noise that is generated as the turbine wheel 110 rotates may be obtained, while the leakage flow can be small enough to avoid notable reduction of the turbocharger performance. In particular, the various relevant dimensions may be chosen such in the design of the turbine housing 100 that a major portion of the exhaust gas flow is guided to the inducer area 111 of the turbine wheel 110 by the tongue 150, while a minor portion of the exhaust gas flow passes through the slit 171 in the tongue 150 as a leakage flow from the upstream side H of the tongue 150 to the downstream side L of the tongue 150 under the influence of a pressure difference across the tongue 150.

FIG. 4 illustrates a first possible design of a bottom surface 172 of the slit 171. In this design, the bottom surface

172 is concentric with the wheel housing space 120. The bottom surface 172 has a radius r to an axis C that is central in the wheel housing space 120. According to a practical option, the radius r as mentioned may be defined between a radius R of the wheel housing space 120 and 130% of the radius R of the wheel housing space 120.

FIG. 5 illustrates a second possible design of a bottom surface 172 of the slit 171. In this design, the bottom surface 172 of the slit 171 generally extends according to a tangential line T that extends in a direction between 80° to 100° to the radius r of the bottom surface 172 as measured in a range of 60° upstream of the tip 152 of the tongue 150 to 20° downstream of the tip 152.

FIG. 6 illustrates aspects of an alternative embodiment of the turbine housing 100, particularly the fact that it is possible to have the open flow path extending through the tongue 150 realized by means of a channel 173 instead of a slit 171. In the shown embodiment, the tongue 150 is provided with two channels 173 extending through the tongue 150, all the way between the upstream side H to the downstream side L. It is practical if the channels 173 are located in an area extending along 90° upstream of the tip 152 of the tongue 150, as is the case in the shown example. Generally speaking, the at least one channel 173 is configured to have the same functionality as the at least one slit 171, namely the functionality of enabling a portion of an exhaust gas flow to pass through at least one of the tongue 150 and the separation wall 160 as a leakage flow.

In the embodiment of the turbine housing 100 shown in FIG. 6, the tongue 150 comprises two open flow paths extending between the upstream side H of the tongue 150 and the downstream side L of the tongue 150. It will be clear to a person skilled in the art that in the framework of the invention, the number of open flow paths through at least one of the tongue 150 and the separation wall 160 may be chosen freely, and that when the number is chosen to be at least two, it is possible to only have slits 171, to only have channels 173, or to have an appropriate combination of at least one slit 171 and at least one channel 173.

FIG. 7 diagrammatically shows a sectional view of a turbine housing 200 of a double-volute design according to an embodiment of the invention, which turbine housing 200 is intended to be applied in a turbocharger. In the double-volute design, the turbine housing 200 comprises two volutes 140 separated by a partition 141, which volutes 140 serve for directing exhaust gas flows to respective sections 121 of the wheel housing space 120 where an inducer area 111 of the turbine wheel 110 is to be located. In this configuration, the turbine housing 200 comprises two sets of a separation wall 160 and a tongue 150. According to the invention, in either one or both of the sets, preferably in both of the sets, at least one of the tongue 150 and the separation wall 160 may be provided with at least one open flow path extending therethrough. It is understood that all of the features or combination of features related to the functionality of enabling a leakage flow of the exhaust gas flow as discussed in the foregoing in respect of the turbine housing 100 of the single-volute design and illustrated in FIGS. 1 and 3-6 are equally applicable to the at least one set of the turbine housing 200 of the double-volute design in which this functionality is realized.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

Notable aspects of the invention are summarized as follows. The invention relates to a turbine housing 100, 200 for use in a turbocharger, comprising a wheel housing space 120, an inlet 130, at least one volute 140, and a tongue 150 that projects from a separation wall 160. The tongue 150 is configured to guide an exhaust gas flow to a section 121 of the wheel housing space 120 where an inducer area 111 of a turbine wheel 110 to be accommodated by the turbine housing 100, 200 is to be located. At least one of the tongue 150 and the separation wall 160 is configured to enable a portion of the exhaust gas flow to pass therethrough as a leakage flow from an upstream side H of the at least one of the tongue 150 and the separation wall 160 to a downstream side L of the at least one of the tongue 150 and the separation wall 160.

REFERENCE LIST

100 turbine housing of a single-volute design
200 turbine housing of a double-volute design
110 turbine wheel
111 inducer area of the turbine wheel
120 wheel housing space
121 section of the wheel housing space
130 inlet of the turbine housing
140 volute
141 partition
150 tongue
151 tip portion of the tongue
152 tip of the tongue
160 separation wall
171 slit
172 bottom surface of the slit
173 channel
F direction of the exhaust gas flow
r radius of the bottom surface of the slit
R radius of the wheel housing space
T tangential line
C axis that is central in the wheel housing space
H upstream side of the tongue and the separation wall
L downstream side of the tongue and the separation wall

The invention claimed is:

1. A turbine housing configured to be used in a turbocharger and to accommodate a turbine wheel, the turbine housing comprising:

an inlet that is configured to introduce an exhaust gas flow of an engine into the turbine housing, at least one volute defining a flow path of the exhaust gas flow through the turbine housing from the inlet towards a wheel housing space in the turbine housing where the turbine wheel to be accommodated by the turbine housing is to be located, and a tongue that projects from a separation wall delimiting a portion of the at least one volute and that is configured to guide the exhaust gas flow to a section of the wheel housing space where an inducer area of the turbine wheel to be accommodated by the turbine housing is to be located, wherein at least one of the tongue and the separation wall is configured to enable a portion of the exhaust gas flow to pass therethrough as a leakage flow from an upstream side of the at least one of the tongue and the separation wall to a downstream side of the at least one of the tongue and the separation wall, wherein the at least one of the tongue and the separation wall includes at least one open flow path extending between the upstream side of the at least one of the tongue and the separation wall and the downstream side of the at last one of the tongue and the separation wall, and wherein the open flow path is provided with an upstream side inlet and a downstream side outlet, and wherein a bottom surface of the open flow path generally extends in a direction of the exhaust gas flow defined by the at least one volute.

2. The turbine housing according to claim 1, wherein the at least one open flow path comprises a slit that is located in a tip portion of the tongue and that is open to the section of the wheel housing space where the inducer area of the turbine wheel to be accommodated by the turbine housing is to be located.

3. The turbine housing according to claim 1, wherein the bottom surface of the open flow path is concentric with the wheel housing space.

4. The turbine housing according to claim 3, wherein a radius of the bottom surface of the open flow path to an axis that is central in the wheel housing space is between a radius of the wheel housing space and 130% of the radius of the wheel housing space.

5. The turbine housing according to claim 1, wherein the bottom surface of the open flow path generally extends according to a tangential line that extends in a direction between 80° to 100° to a radius of the bottom surface of the open flow path as measured in a range of 60° upstream of the tip of the tongue to 20° downstream of the tip of the tongue.

6. The turbine housing according to claim 1, wherein the at least one open flow path comprises a channel that extends through one of the tongue and the separation wall.

7. The turbine housing according to claim 6, wherein the channel is located in an area extending along 90° upstream of the tip of the tongue.

8. The turbine housing according to claim 1, wherein the tongue includes at least two open flow paths extending between the upstream side of the tongue and the downstream side of the tongue.

9. The turbine housing according to claim 1, being of a single-volute design or of a multi-volute design.

10. The turbine housing according to claim 1, being of a double-volute design and comprising two sets of the separation wall and a tongue that projects from the separation wall, wherein at least one of the tongue and the separation wall is configured to enable a portion of the exhaust gas flow to pass therethrough as a leakage flow from an upstream side of the at least one of the tongue and the separation wall to a downstream side of the at least one of the tongue and the separation wall in each of the two sets of a separation wall and a tongue that projects from the separation wall.

11. A turbocharger comprising a turbine housing according to claim 1 and the turbine wheel accommodated by the turbine housing, wherein the turbine wheel is located in the wheel housing space of the turbine housing.

12. A method of directing an exhaust gas flow of an engine through a turbine part of a turbocharger where a turbine housing and a turbine wheel accommodated by the turbine housing are present, the method comprising:

enabling the exhaust gas flow to proceed through the turbine housing from an inlet of the turbine housing towards the turbine wheel, and enabling a major portion of the exhaust gas flow to proceed along a separation wall in the turbine housing and a tongue that projects from the separation wall, and to be guided to an inducer area of the turbine wheel by the tongue, while enabling a minor portion of the exhaust gas flow to pass through at least one of the tongue and the separation wall as a leakage flow from an upstream side of the at least one of the tongue and the separation wall to a downstream side of the at least one of the tongue and the separation wall under the influence of a pressure difference across the at least one of the tongue and the separation wall, wherein the at least one of the tongue and the separation wall includes at least one open flow path extending between the upstream side of the at least one of the tongue and the separation wall and the downstream side of the at least one of the tongue and the separation wall, and wherein the method comprises enabling the minor portion of the exhaust gas flow to proceed through the at least one open flow path, and wherein a bottom surface of an open flow path generally extends in a direction of the exhaust gas flow defined by the at least one volute.

13. The method according to claim 12, wherein the at least one open flow path comprises a slit that is located in a tip portion of the tongue and that is open to the inducer area of the turbine wheel, and wherein the method comprises enabling the minor portion of the exhaust gas flow to proceed through the slit.

14. The method according to claim 12, wherein the at least one open flow path comprises a channel that extends through one of the tongue and the separation wall, and wherein the method comprises enabling the minor portion of the exhaust gas flow to proceed through the channel.

* * * * *